US009488469B1

(12) United States Patent
Michael et al.

(10) Patent No.: US 9,488,469 B1
(45) Date of Patent: Nov. 8, 2016

(54) SYSTEM AND METHOD FOR HIGH-ACCURACY MEASUREMENT OF OBJECT SURFACE DISPLACEMENT USING A LASER DISPLACEMENT SENSOR

(71) Applicant: Cognex Corporation, Natick, MA (US)

(72) Inventors: David J. Michael, Wayland, MA (US); Aaron S. Wallack, Natick, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 14/257,628

(22) Filed: Apr. 21, 2014

Related U.S. Application Data

(60) Provisional application No. 61/814,747, filed on Apr. 22, 2013.

(51) Int. Cl.
*G01B 11/14* (2006.01)

(52) U.S. Cl.
CPC .................................... *G01B 11/14* (2013.01)

(58) Field of Classification Search
CPC ...................................................... G01B 11/14
USPC .......................................................... 356/614
See application file for complete search history.

(56) References Cited

U.S. PATENT DOCUMENTS

| 4,188,544 | A | * | 2/1980 | Chasson | ............ | G01B 11/2504 |
| | | | | | | 144/357 |
| 4,498,778 | A | * | 2/1985 | White | .................... | G01B 11/25 |
| | | | | | | 348/94 |
| 4,891,630 | A | | 1/1990 | Friedman et al. | | |
| 5,081,689 | A | | 1/1992 | Meyer et al. | | |
| 5,361,308 | A | * | 11/1994 | Lee | ..................... | G01B 11/2441 |
| | | | | | | 348/131 |
| 5,652,658 | A | | 7/1997 | Jackson et al. | | |
| 5,668,631 | A | | 9/1997 | Norita et al. | | |
| 5,745,176 | A | | 4/1998 | Lebens | | |
| 6,064,759 | A | * | 5/2000 | Buckley | ............... | G01B 11/024 |
| | | | | | | 348/125 |
| 6,121,980 | A | | 9/2000 | Cho | | |
| 6,369,818 | B1 | | 4/2002 | Hoffman et al. | | |
| 6,501,554 | B1 | | 12/2002 | Hackney et al. | | |
| 6,504,957 | B2 | | 1/2003 | Nguyen et al. | | |
| 6,522,777 | B1 | | 2/2003 | Paulsen et al. | | |
| 6,690,841 | B2 | | 2/2004 | Nguyen et al. | | |
| 7,023,441 | B2 | | 4/2006 | Choi et al. | | |

(Continued)

FOREIGN PATENT DOCUMENTS

WO    9524017          9/1995
WO    2014037709 A1    3/2014

*Primary Examiner* — Roy M Punnoose
(74) *Attorney, Agent, or Firm* — Loginov & Associates, PLLC

(57) ABSTRACT

This invention provides a system and method for the high-accuracy measurement of an object's surface displacement at a plurality of measurement points using a laser displacement sensor and a sensor process that corrects for noise and other accuracy-reducing factors. A camera assembly with an imager and optics package acquires images of an object surface, and a laser assembly projects a line on the object surface. These tasks can include (a) defining patches of the surface based upon a grid; (b) registering the object and aligning the grid with respect to the object; (c) excluding from the analysis of the image, irregular surface features; (d) oversampling one or more patches to improve overall accuracy; (e) specifying measurement resolution (i.e. in the (x, y z) dimensions), including choosing appropriate pixel sizes and number of measurements per measurement point; and (f) selecting optimal acquisition/image formation parameters.

20 Claims, 7 Drawing Sheets

(56) References Cited

U.S. PATENT DOCUMENTS

| | | |
|---|---|---|
| 7,039,228 B1 | 5/2006 | Pattikonda et al. |
| 7,084,989 B2 * | 8/2006 | Johannesson ........ G01B 11/046 356/601 |
| 7,177,740 B1 | 2/2007 | Guangjun et al. |
| 7,199,881 B2 * | 4/2007 | Martinschledde . H04N 13/0253 348/E13.018 |
| 7,382,897 B2 | 6/2008 | Brown et al. |
| 7,583,372 B2 | 9/2009 | Shylanski et al. |
| 7,672,485 B2 * | 3/2010 | Chambard ......... G01B 11/2513 348/128 |
| 7,751,065 B2 * | 7/2010 | Nishio ................. G01B 11/026 356/606 |
| 7,843,574 B2 * | 11/2010 | Schmitt ................ G01B 11/245 356/611 |
| 7,872,764 B2 | 1/2011 | Higgins-Luthman et al. |
| 8,538,164 B2 | 9/2013 | Zitnick, III |
| 8,774,498 B2 | 7/2014 | de Campos et al. |
| 8,867,858 B2 | 10/2014 | Fattal et al. |
| 2005/0030525 A1 | 2/2005 | Forster et al. |
| 2005/0068522 A1 | 3/2005 | Dorrance et al. |
| 2006/0274302 A1 | 12/2006 | Shylanski et al. |
| 2008/0013103 A1 * | 1/2008 | Inoue ..................... G01B 11/25 356/610 |
| 2008/0094643 A1 * | 4/2008 | Nishio ................. G01B 11/026 356/623 |
| 2008/0106747 A1 * | 5/2008 | Kudo ................ G01D 5/34792 356/616 |
| 2009/0095047 A1 * | 4/2009 | Patel .................. G06K 7/10722 73/1.01 |
| 2009/0174773 A1 | 7/2009 | Gowdy et al. |
| 2014/0347473 A1 * | 11/2014 | Wolff ................... G01B 11/026 348/135 |

* cited by examiner

SYSTEM AND METHOD FOR HIGH-ACCURACY MEASUREMENT OF OBJECT SURFACE DISPLACEMENT USING A LASER DISPLACEMENT SENSOR

RELATED APPLICATIONS

This application claims the benefit of U.S. Provisional Application Ser. No. 61/814,747, filed Apr. 22, 2013, entitled SYSTEM AND METHOD FOR HIGH-ACCURACY MEASUREMENT OF OBJECT SURFACE DISPLACEMENT USING A LASER DISPLACEMENT SENSOR, the entire disclosure of which is herein incorporated by reference.

FIELD OF THE INVENTION

This invention relates to machine vision systems used in determining the displacement of an imaged object surface in three dimensions (3D).

BACKGROUND OF THE INVENTION

In manufacturing and assembly processes, it is often desirable to measure an object surface with a high degree of accuracy. One technique for performing such measurements with high accuracy (e.g. on the order of microns) and low noise is to employ a coordinate measuring machine (CMM). The CMM applies a touch probe to the surface of the object, which can be mounted on a moving motion stage (or, alternatively, the touch probe can be moved). As motion occurs (e.g. in the physical x and physical y-coordinate directions) the probe contacts a number of locations along the object surface, thereby generating a map of the overall displacement (e.g. in the physical z-coordinate direction) with respect to various locations on the object surface. Since this approach requires contact with the surface, it tends to be time-consuming.

Alternatively, the displacement (or "profile") of the object surface can be determined using a machine vision system (also termed herein "vision system") in the form of a laser displacement sensor (also termed a laser beam "profiler"). A laser displacement sensor captures and determines the (three dimensional) profile of a scanned object surface using a planar curtain or "fan" of a laser beam at a particular plane transverse to the beam propagation path. In a conventional arrangement, a vision system camera assembly is oriented with an optical axis at a non-parallel angle relative to the plane of the beam. This arrangement captures the profile of the projected line (e.g. extending along the physical x-axis) on the object surface, which, due to the relative angle between the beam (fan) plane and the camera optical axis causes the imaged line to appear as varying in the image y-axis direction as a function of the physical z-axis height of the imaged point (along the image x-axis). The camera typically resides above the surface plane and the camera lens axis resides at an acute angle (i.e. off-axis) relative to the plane so as to capture the deviation of the laser line upon the surface. This deviation represents the profile of the surface. Laser displacement sensors are useful in a wide range of inspection and manufacturing operations where the user desires to measure and characterize surface details of a scanned object via triangulation. One form of laser displacement sensor uses a vision system camera having a lens assembly and image sensor (or "imager") that can be based upon a CCD or CMOS design. The imager defines a predetermined field of grayscale or color-sensing pixels on an image plane that receives focused light from an imaged scene through a lens.

In a typical arrangement, the displacement sensor and/or object are in relative motion (usually in the physical y-coordinate direction) so that the object surface is scanned by the camera, and a sequence of images are acquired of the laser line at desired spatial intervals—typically in association with an encoder or other motion measurement device (or, alternatively, at time based intervals). Each of these single profile lines is typically derived from a single acquired image. These lines collectively describe the surface of the imaged object. While this approach is faster than a CMM, it tends to suffer from random noise due, for example, to laser speckle, which can reduce physical z-height measurement accuracy at a single point to the range of 100 microns RMS. This and other challenges (described further below) limit the accuracy and applicability of a conventional laser displacement sensor.

SUMMARY OF THE INVENTION

This invention overcomes disadvantages of the prior art by providing a system and method for the high-accuracy measurement of an object's surface displacement (e.g. physical z-axis displacement, range, or 'height") at a plurality of virtual surface touch points ("measurement points") using a laser displacement sensor in conjunction with a sensor process that corrects for noise and other accuracy-reducing factors (e.g. motion stage jitter, surface specularity, occlusion, and surface irregularities). The laser displacement sensor includes a vision system camera assembly with an imager and optics package, which acquires images of an object surface, and a laser assembly that projects a line on the object surface within the field of view of the camera assembly. The sensor process performs various tasks in acquiring and processing images of the line as the object and/or displacement sensor move relatively to one another and builds these images into an overall two-dimensional (2D) displacement/range image of the surface. A 2D range image consists of a two-dimensional array, where the indices of the array corresponds to physical-x and physical-y locations on the surface and where each element of the array is a calibrated or uncalibrated value that corresponds to the displacement, range, or z-height of the surface. Note that when the range image is uncalibrated, the indices of the array may not necessarily correspond to uniformly spaced physical-x and physical-y locations on the surface. Further, when the range image is uncalibrated, the indices of the array may not necessarily correspond to the same physical-x and physical-y positions in different range images. These sensor process tasks can include (a) defining patches of the surface based upon a grid ("grid" being defined generally as any subdividing of the surface); (b) optionally registering the object and aligning (and realigning) of the grid with respect to the object surface; (c) excluding from the analysis of the image, irregular surface features that can cause false or inaccurate readings, such a dimples, bevels, protrusions; (d) oversampling one or more patches to improve overall accuracy and reducing the effects of random noise by averaging such oversampled measurements; (e) specifying measurement resolution (i.e. in the (x, y z) dimensions), which can include choosing appropriate pixel sizes and number of measurements per measurement point; and (f) selecting optimal acquisition/image formation parameters (for example with a goal to minimize laser reflection and/or blooming by intentionally tilting the laser displacement sensor and/or object with respect to each other. The described methods do not necessarily improve the accuracy of the range image sensor at each individual pixel or pel measurement (i.e. the relative positioning of a single pixel/pel with respect to the acquired image as provided by the displacement sensor); rather, the described system and method improves the accuracy of composite measurements that are based on a combination of the displacement sensor's individual pel measurements. The term "z-axis measurement" is sometimes used herein to describe a composite measurement. The term "height measurement" is also sometimes used herein to describe a composite measurement.

In an illustrative embodiment, a system and method for measuring displacement of an object surface includes the use of a displacement sensor that projects a line on the object surface and receives light from the projected line at an imager. The imager receives the light in pixels or pels that define a plurality of displacement values in a height direction. A vision system processor operates to process at least two rows of displacement value image data from the imager, and thereby define a plurality of patches with respect to the displacement value image data. The patches are oriented to register features of the image data. A displacement sensor process, performed by the processor, averages the displacement values in each of the patches to obtain an average patch displacement value. Illustratively, the object and the displacement sensor are in relative motion, and a plurality of images are acquired of the projected line. The motion is defined so that displacement values are oversampled. The patches containing predetermined features can include pixels that are excluded by the displacement sensor process. Those predetermined features can include at least one of dimples, bevels, edges, protrusions or occlusions. Illustratively, a registration tool locates at least one feature on the object and registers the patches with respect to the object. More generally, the displacement sensor process can vary resolution of pixels in at least one dimension to oversample displacement values in that at least one dimension. The displacement sensor can be angled with respect to the object surface to minimize blooming from light received by the imager. The displacement sensor process can be arranged to search average patch displacement values in a region located with respect to a feature to determine a patch containing a maximum displacement for the feature. The displacement sensor process can compare the patch containing the maximum displacement value to a reference patch displacement value to compensate for vibration. Illustratively, each of the patches defines a size between 8×8 and 100×100 pixels. Also illustratively, the displacement sensor process can exclude patches having a preponderance of missing or insignificant displacement values.

In another illustrative embodiment, a vision system is provided, which includes an imager that receives light from a projected line on a surface. The light generally defines a plurality of displacement values in a height direction. A vision system processor, operatively connected to the imager, is arranged to: (a) process at least two rows of displacement value image data from the imager within a plurality of patches with respect to the displacement value image data, wherein the patches being oriented to register features of the image data; and (b) average the displacement values in each of the patches to obtain an average patch displacement value. Illustratively, the imager is enclosed in a laser displacement sensor housing that projects a laser line on the surface.

BRIEF DESCRIPTION OF THE DRAWINGS

The invention description below refers to the accompanying drawings, of which.

DETAILED DESCRIPTION

I. System Overview

Figure 1:
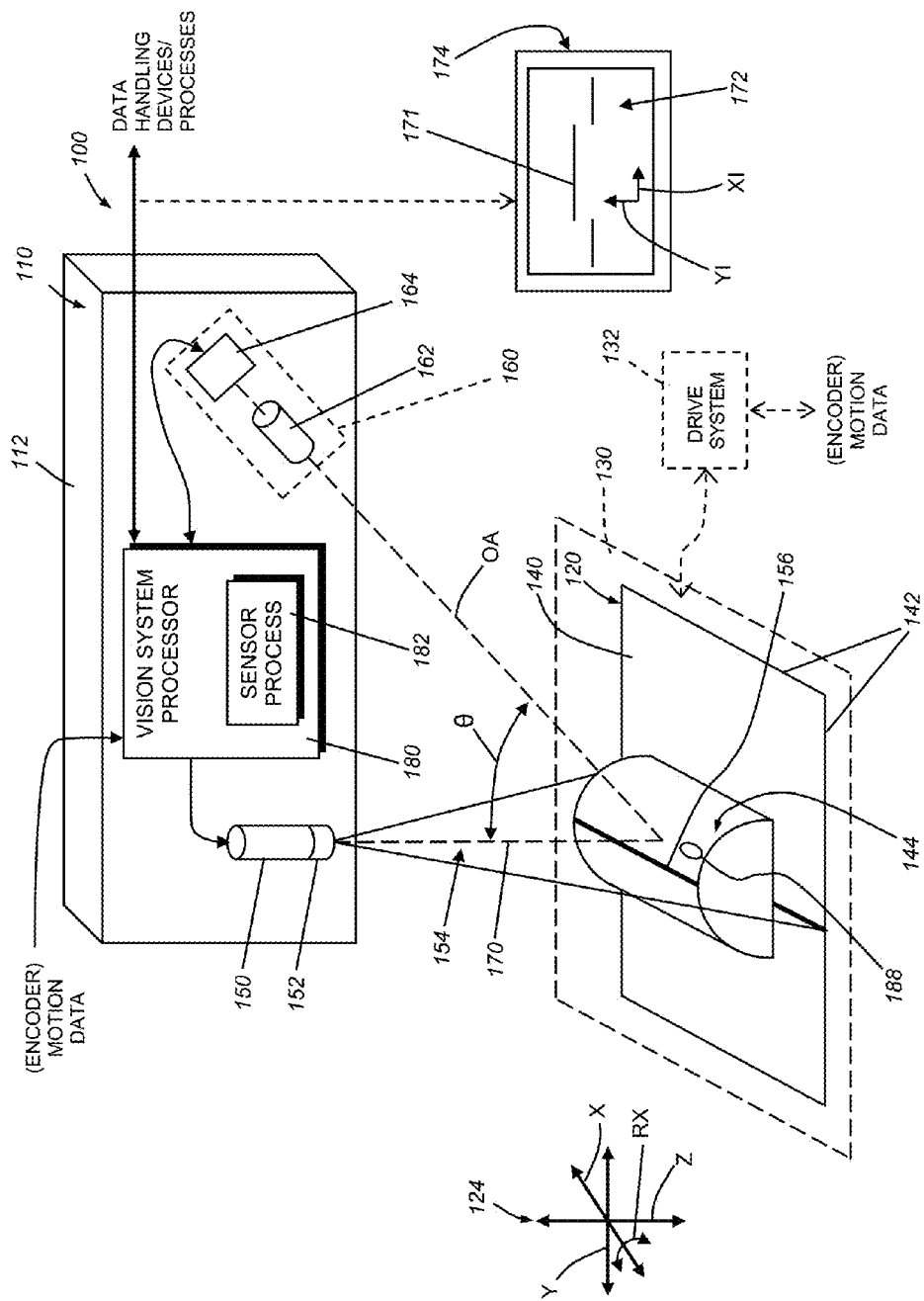
FIG. 1 is a schematic perspective view of a laser displacement sensor system acquiring an image of an object as relative motion occurs therebetween in a scanning direction according to an illustrative embodiment.

FIG. 1 shows a vision system arrangement 100 including a laser displacement sensor assembly 110 oriented to image an object 120 (also sometimes referred to as a "part"). The displacement sensor assembly (or, simply "displacement sensor") can be contained in a single housing 112 that is mounted at an appropriate location with respect to the imaged scene. In alternate embodiments, the displacement sensor can comprise discrete, separated subcomponents. The object 120 and the displacement sensor 110 are in relative motion (double arrow My) with either the displacement sensor 110, the object 120, or both, moving (the scan motion direction) along at least one axis of the relative coordinate system 124 (in this example, the physical y-axis direction). In a typical arrangement, the object 120 is located on a precision motion stage 130 (shown in phantom) that provides motion data from an encoder or similar device operatively connected to the motion stage drive system 132 in a manner clear to those of skill in the art. The object 120 is, by way of example, a structure having a surrounding surface 140 that is relatively planar and extends to an outer perimeter 142. Located internal of the exemplary outer perimeter 142 is a surface 144 that varies in displacement along the physical z-axis direction (e.g. a semi-cylinder). This is only one example of a wide range of possible surface shapes, and is described as a useful example of the principles of the illustrative embodiment of the system and method. In further examples the outer, surrounding surface can define a more complex perimeter with additional features, such as fastener holes and the inner structure can be a more variable shape.

Likewise, an outer, surrounding surface can be omitted form an exemplary object, in whole or in part.

The displacement sensor assembly 110 includes a laser assembly 150 that includes a lens or other optical arrangement 152 (e.g. a Powell lens or a cylindrical lens) that projects a curtain or fan 154 of laser light, toward the object 120 in a manner that forms a line 156 along the physical x-axis (transverse to the scan motion direction My). The fan 154 resides generally in a plane that, in this embodiment, is approximately (or substantially) perpendicular to a reference plane, such as the physical x-y plane of the motion stage 130 and/or a plane of the surrounding object surface 140. The displacement sensor 110 also includes a camera assembly (dashed box 160) consisting generally of a lens/optics assembly possibly arranged in a well-known Scheimpflug configuration 162 and an imager assembly ("imager") 164. The imager 164 contains an array of photosensitive pixels at a predetermined resolution, and the camera assembly generally defines an optical axis OA that intersects the object 120 in the region of the line 156. The optical axis OA defines a non-parallel (e.g. acute) angle θ with respect to the plane (and associated line 170) of the laser fan 154. Thus, any physical z-axis height variation/displacement in the line along the physical x-axis is imaged by the camera assembly 160 as a variation in position (along the image axis YI) in the resulting line 171 of a two-dimensional (2D) image 172 as shown generally in the exemplary (and optional) display 174.

Note that the arrangement of axes (x, y, z) is a convention and other representations of relative orientation (e.g. polar coordinates) are expressly contemplated. As shown, rotation about a given axis is also represented, for example by the double-curved arrow Rx, which depicts rotation about the physical x-axis.

The imager 164 is operatively interconnected to a vision system processor 180 that is contained within the housing 112 of the displacement sensor 110 in this embodiment. In alternate embodiments, some or all of the vision system processor components and/or processes can reside remote from the housing (on an interconnected PC, for example). The vision system processor 180 performs a displacement sensor process 182 in accordance with the illustrative embodiment described in detail further below. The processor 180 also receives relative motion signals from the motion stage 130 or another moving device (e.g. a gantry or manipulator holding the displacement sensor and/or the object). Images are acquired in association with such motion signals so that the line 156 is imaged at specified object positioning's in the scene.

As also described below, the image data (i.e. a 2D range image) for the object is transmitted to downstream data handling devices and processes for use in various production activities, such as quality control, object manipulation, assembly, etc. Users typically desire measurements characterized in physical units (e.g., millimeters or microns in x and y and z), rather than image units (i.e. pixels/pels in x, encoder motion-based triggers in y, and row displacements in z). For this reason, displacement sensors are typically calibrated to convert between image pixel outputs and physical units, such that the calibrated displacement sensor output is in physical units. Displacement sensor calibration can be performed by the manufacturer such that the displacement sensor provides output in physical units (such as the model DS1100 available from Cognex Corporation of Natick, Mass.). Alternatively, sensors can provide output in uncalibrated image units. When the sensor output is in uncalibrated image units, the user or application is tasked with handling input data in image pixel units.

Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software.

II. Displacement Sensor Process

Figure 2:
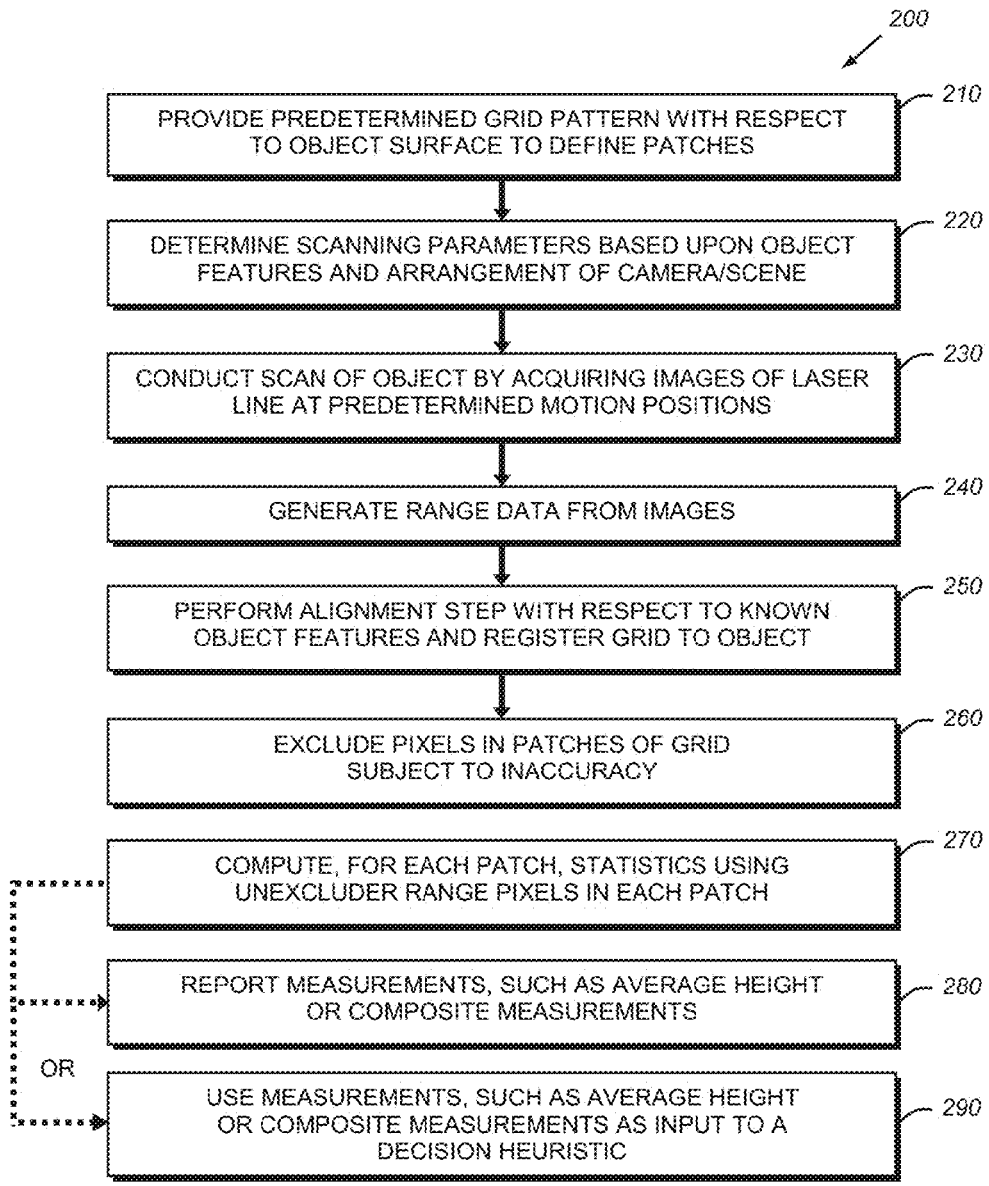
FIG. 2 is a flow diagram of an overall process for measuring displacement (height) of an object surface using the displacement sensor and associated processor of FIG. 1.

It has been recognized that various factors reduce the accuracy of a displacement sensor when employed in a conventional manner, in which a series of line images are acquired at various motion stage positions, and the data of each line is analyzed independently to generate a slice of height image data (alternatively termed "range" image data) (composed of height pixels or "pels" alternatively termed range pixels or "pels") with respect to the object. The acquired height pixels in each slice are potentially subject to one or more of these factors. The procedure 200 of FIG. 2 provides illustrative steps for addressing one or more of these factors.

As shown, in step 210 the procedure 200 provides a grid pattern that is tailored to the shape of the object. The grid pattern can be any appropriate shape and orientation. For example it can be rectilinear, concentric, or a combination of such geometric shapes. One purpose of the grid pattern is to denote portions of the object in which to measure average z heights. By way of illustration with respect to an image 310 of the object 120, a simplified grid pattern 320 (dashed lines) is established around the image features 330 of the surface 144. This grid includes a series of patches (within enclosed grid regions) that represent differing areas for analysis by the sensor process. More particularly, and as described further below, the patches are each discrete regions in which the z-axis height of the object surface will be measured. More-focused patches have been established around the edges 340, 342, 344 and 346 of the surface where it meets the surrounding surface (140 in FIG. 1). Likewise a patch 352 has been defined around the image 350 of a corresponding bump 188 in FIG. 1. The edges and bump provide potential surface irregularities that can result in line occlusion, specular reflections/blooming and (for the bump) false height readings. False height can be caused by blooming in the imager, as can occur when the laser is reflected directly back into the image sensor by a specular or highly reflective surface. Curved parts are also more likely to exhibit blooming because a curved surface often contains a (relatively small) patch that reflects laser light directly into the image sensor; i.e., some of the range pixel/pel measurements will define a false height. False heights can also occur due to multiple reflections, such as when the laser is reflected by a surface in the scene, and then that reflected light illuminates a different portion of the scene.

Figure 3:
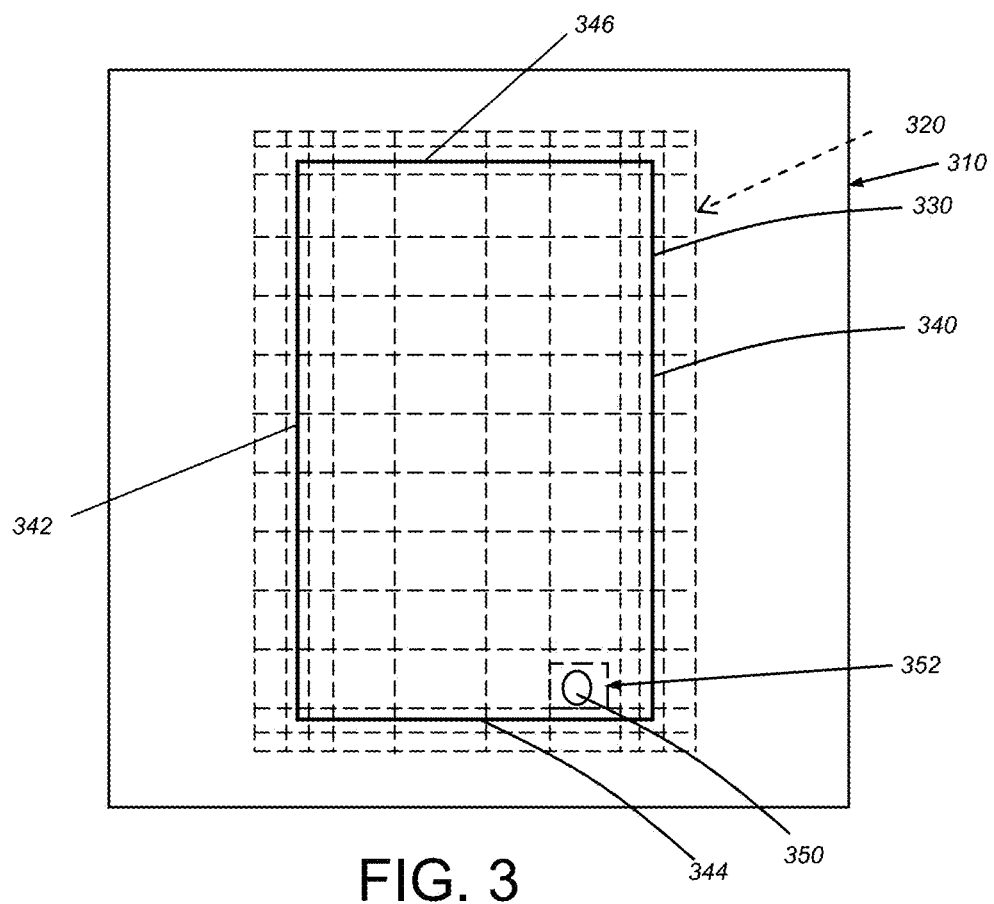
FIG. 3 is a schematic diagram of the establishment of a grid of patches on an image of an object surface according to the process of FIG. 2.

The grid 320 is typically pre-established in a training step for the object. This step can identify various regions on the surface that can be subject to inaccuracy. The grid is arranged to isolate such features and ensure that measurement points are made excluding, or otherwise accounting for, such features. Desirably, each patch in the grid that will contribute to a reported measurement is approximately planar (without dimples, protrusions, bevels, or the like) so that individual measurement points within that patch can be reported as the average measurement or composite measurement from the all the individual measurement points within the patch with less error. Note specifically that each patch in the grid can be of a different size as illustrated generally in FIG. 3.

The procedure 200 determines various scanning parameters in step 220. These can include determining (a) the scan rate; (b) the number of images to be acquired per increment (e.g. millimeter) of scan motion; (c) the positioning of the displacement sensor 110 with respect to the object being scanned; (d) the length of camera exposure so as to minimize imager saturation; (e) the physical size of the image in the non-motion (x-axis) direction; (f) a selected measurement resolution for predetermined measurement points; and (g) the control of the scan in the motion direction (y-axis) to oversample image pixels/pels in predetermined patches.

Figure 4:
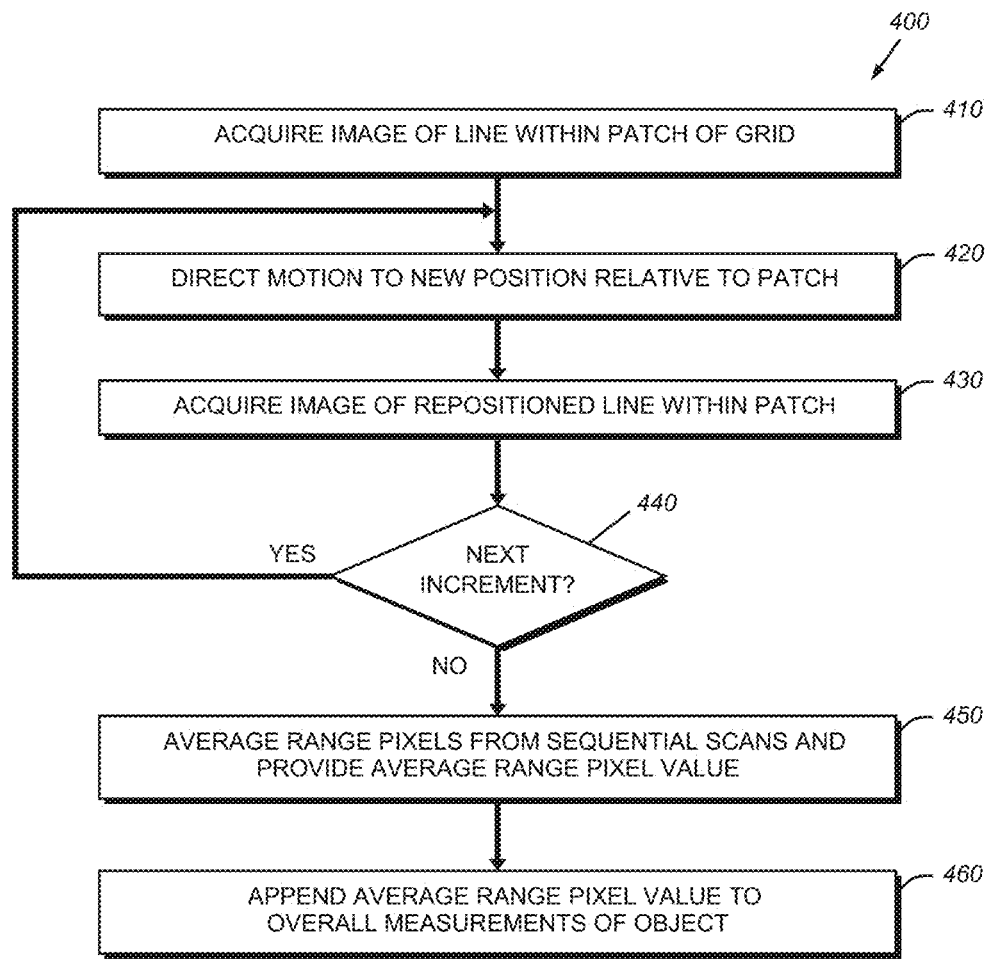
FIG. 4 is a flow diagram of an oversampling procedure acquiring images in a motion direction of the object according to the process of FIG. 2.

With reference to the procedure 400 of FIG. 4, the scan performs an oversampling of image data by acquiring scan lines for motion steps smaller than the thickness of the laser such that a feature registered in one of the scan lines will intentionally be observable in multiple previous and successive scan lines in step 420. Note that oversampling in the non-motion physical x-axis direction can be accomplished by changing the size of the pixels (varying camera resolution) (which would involve changing the image formation system which would be done before starting the acquisition of a range image) as described below or by providing incremental physical x-axis motion between the object and displacement sensor. In the procedure 400, the displacement sensor acquires another image of the line at the new incremental position (step 430). When images are acquired at each increment to appropriately scan all patches of interest, (decision step 440) the image data is transferred to an averaging step 450, which averages all range pixels for each patch of interest and establishes an average range pixel value (or values) for that patch (step 450). Notably, this illustrative oversampling process (400), unlike conventional industrial laser displacement scanning techniques, allows for the generation of 10 micron by 10 micron range image elements so that a 1 square-millimeter patch can contain 10,000 averaged range pixels/pels. This number of averaged pixels significantly attenuates random noise and other inaccuracy-generating factors. The statistical formula used for averaging the pixels in a patch is highly variable and can consist of a straight average, sum-of-least-squares, or another acceptable formula.

Note that smaller range pixels/pels can be used so that patch averaging can use more range pels for the same physical area. Typically, users expect the range image x-physical pixel size and range image y-physical pixel size should have the same physical size as each other so as to provide physically square pixels. In certain cases, square pixels may be suboptimal in terms of accuracy and/or speed performance. The range image x physical pixel size should correspond to the imager's native pixel/pel size at the height of the object, or at least half the imager's native pixel/pel size at the height of the object due to Nyquist's sampling theorem, (note that there is typically minimal benefit, in the example of a Cognex model DS1100, in setting the x-axis pixel size lower than 50 microns). The range image y-axis physical pixel size depends on the stage motion and encoder settings. Decreasing millimeter/row provides for smaller range pixels/pels (note that each range image row is obtained in a single image acquisition). This can result in non-square range pixels/pels, in which the range pixels/pels can define a physical x-axis width of 100 microns, but y-axis physical height of 50 microns. Intentionally selecting the range image x-physical pixel size and the range image y-physical pixel size may be preferred because it provides all the pertinent information without involving an excessively large range image (which could occur if the range image x-physical pixel size was made to be the same resolution as the range image y-physical pixel size).

In step 460 of the oversampling procedure 400, the averaged range pixels/pels in each patch are supplied to overall composite measurements of the object surface. The composite measures based on sampling this range image have significantly increased accuracy.

The system then conducts a scan of the object in accordance with step 230. The scan consists of moving the object and/or displacement sensor and acquiring images of the projected laser line at a multiplicity of incremental positions. The scan output directly generates a range image. Usually, range images contain at least information from two scans and can be characterized in physical units as provided by displacement sensors such as the model DS-1100 available from Cognex Corporation of Natick, Mass. Alternatively, range images can be provided in image units. Range images can be calibrated or uncalibrated. The location of positions can be dictated by the geometry of the grid and other factors, such as the encoder resolution and/or pixel resolution. That is, patches oversampled by reducing the distance between increments and thereby providing overlap between acquired images and associated pixels/pels. Usually, each object is scanned only once, but, alternatively, objects can be rescanned to change resolution or scanning parameters for subsequent scans of the same object or portions of the same object.

Note that the user has a choice of where to place the sensor with respect to the expected object. The sensor provides different accuracies for different regions of the physical space. This is because of perspective, and that objects closer to the camera appear larger. Another consideration is the size of the object, and the region that the camera can see depends on the region in physical space. Yet another consideration is that the apparent thickness of the laser line changes for different regions of the physical space. A further consideration is the actual thickness of the laser line for different regions of the physical space—there is a location in physical space where the laser line is narrowest.

Based upon the scan(s) of step 230, the procedure 200 generates range data based upon the acquired images in step 240. This image data is used in further steps to provide displacement/height measurements of the object surface.

Based upon the established grid, step 250 of the procedure 200 performs an optional alignment process on the object, according to conventional techniques and using conventional vision tools, to locate reference points on the object and orient the coordinate system with respect to object reference points—for example, corners or edges in the image. The optional alignment can be performed with respect to translational degrees of freedom (x, y), with respect to translational and rotational degrees of freedom (x, y, θ), with respect to translational, rotational, and height degrees of freedom (x, y, θ, z), or other alignment techniques. In general, at least some reference features can remain in view throughout the scan for reasons described further below. The alignment process can be undertaken by images provided with the camera assembly 160 or with a separate camera and illumination assembly (not shown) that maps alignment information from its own coordinate system to the coordinate system of the object. After determining the alignment of the object, the grid is registered with the object so that any analyzed image data of the laser line is located with respect the appropriate grid patch.

Alternatively, in an embodiment, the grid is fixed with respect to the imaged scene and object. The object can be physically fixtured to ensure that the grid is properly aligned with the object at each increment of motion during the scan. This requires precise knowledge of the location of the object at each motion step (with the state of motion being indicated by the encoder/motion sensor data received at the vision system processor).

With reference to the step 260, of the procedure 200 of FIG. 2, the acquired range pixels associated with the laser line can be filtered to exclude any that appear in particular patches containing features likely to cause inaccuracy such as bumps/projections, bevels, edges, holes, dimples, false height, and/or occlusions. These excluded regions can be determined generally during training of the process, in which such features are identified on the object.

In the case of false height, one cause of false height is bright/saturated laser lines. Other indicators can reveal a possible false height. For example, if a measured range data point appears to contradict the known surface topology (e.g. a bump top that is not in the middle of the bump because a reflection has placed it in the front side of the bump), then a false height is likely and should be addressed in the settings. Identifying such anomalies can entail a search for bright/saturated laser lines (blooming) in the raw intensity image as objects are scanned or analyzing a composite intensity image which can be provided as a complement to the peak image. The grid and other settings can be adjusted (e.g. exclusion of the patch containing the false height) by the user or by automated mechanisms to avoid such identified false height occurrences. For example, the displacement sensor could mark abnormally bright regions as "missing data", where abnormally bright is determined by comparing a measure based on a pixel or pixels from the raw intensity image with a user-specified or adaptive threshold.

Note that a further approach to oversampling (see FIG. 4) and addressing the occurrence of inaccuracy-causing features is to vary the measurement resolution along the x, y and/or z dimensions by choosing appropriate pixel/pel sizes and the number of measurements per measurement point. As described, this can allow for oversampling in the non-motion (x-axis) direction as pixel resolutions are varied to generate a plurality of pixel/pel data for this direction that are part of the average in step 460 (FIG. 4).

In general, backscattered light from the laser line is not saturated and, thus is less disposed to induce false height or other blooming effects. However, surface specularity and geometry can sometimes cause inaccuracy due to laser reflections/blooming. These effects can be addressed in accordance with above-described step 220, in which optimal acquisition/image formation parameters are selected for the particular object. As shown illustratively in FIG. 5, the orientation of the displacement sensor 110 causes saturated light 512 from the laser fan 510 to reflect from portions of the object 520 directly into the camera assembly along the optical axis OA. This results in an overly bright exposure and potential false height readings. As shown in FIG. 6, by appropriately tilting (typically about the physical x-axis but alternatively, and significantly, about an arbitrary physical axis) the object on the motion stage or with an appropriate fixture, and/or by tilting the displacement sensor, the optical axis OA 512 moved out of alignment with the reflected light 512 to avoid saturation and ensure appropriately backscattered light is transmitted to the camera assembly. This tilt reduces or eliminates the blooming effect and can also assist in viewing features that are occluded in the arrangement of FIG. 5. Note that the tilt of the object or displacement sensor can be fixed throughout the scan process or tilt can be induced at a particular time during the scan process so as to capture a better set of images of the laser line at certain scan motion positions. It is also contemplated that the laser and the camera assembly can be tiltable with respect to each other, provided in different housings or on movable mounts within a single housing. Likewise, in various embodiments, either the object or the displacement sensor can be rotated about the physical z-axis by 180 degrees (or another rotation angle, such as 90 degrees), and the object is scanned from the new, opposing orientation. The results of both scans can be combined, omitting data known to be inaccurate in either orientation. Note that composite measurements based upon one or more scans, which can be combined, can provide higher accuracy.

Figure 5:
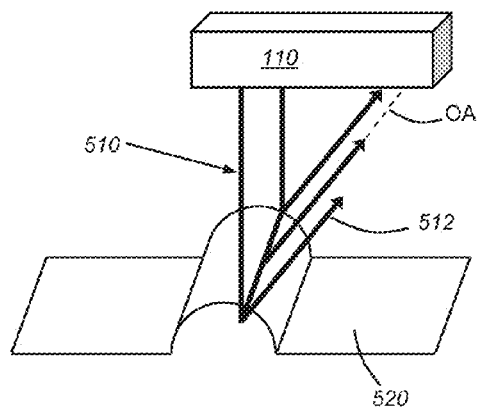
FIGS. 5 and 6 are diagrams respectively showing a vertical and tilted orientation of the displacement sensor of FIG. 1 with respect to the object surface to account for blooming and other undesired effects.
Figure 6:
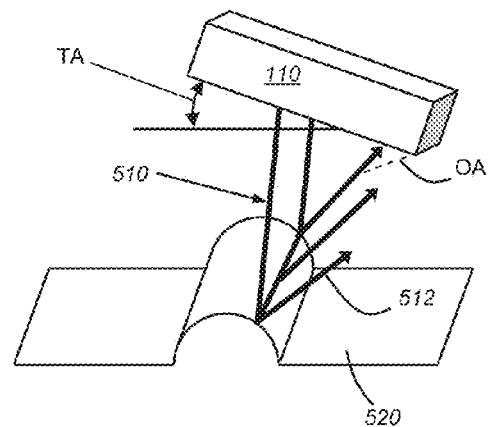

Note also that when tilting the camera, the physical z-axis measurements (as measured by the displacement sensor 110) are multiplied by 1/cos(TA) (where TA is the depicted angle of the tilt of the displacement sensor 110) because the measurements along the laser fan plane are extended longer than a vertical measurement as provided in the "vertical" arrangement of FIG. 5. Consequently, the physical z-axis measurements supplied by the displacement sensor should be multiplied by cos(TA) to arrive at the actual z-axis measurements.

Figure 7:
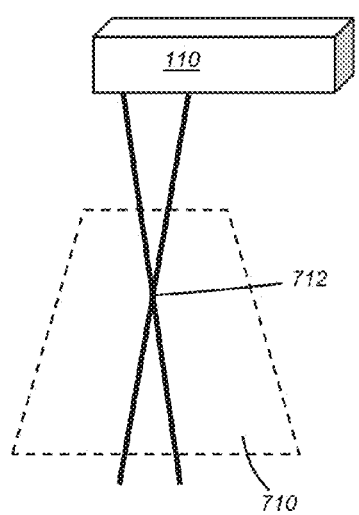
FIGS. 7 and 8 are diagrams showing the positioning of the displacement sensor of FIG. 1 to project a laser line at a waist of the curtain/fan in a vertical and tilted orientation, respectively, so as to improve accuracy.
Figure 8:
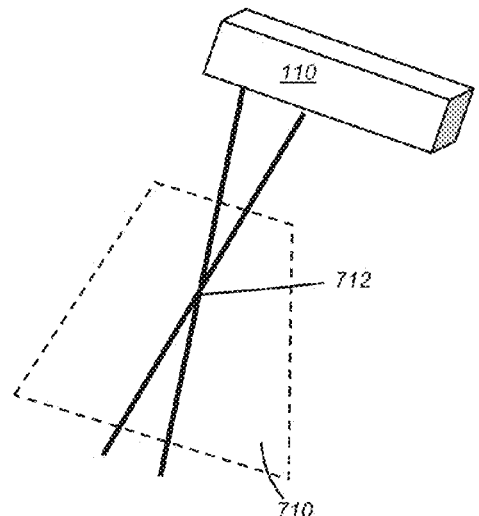

It is also recognized that the optics can cause projected beam to exhibit a narrowing or "waist" along a middle location of the working section along the physical z-axis. With reference to FIGS. 7 and 8, the displacement sensor 110 or object can be positioned so that so that one or more selected object feature(s) reside at the beam waist 712 can also reduce the effects of false height. Thus the sensors measurement region 710, where the camera can appropriately image the features is depicted residing at the waist 712. Measuring features at the laser's "waist" (where the laser line is thinnest) can reduce false height due to specular reflection. This arrangement can be implemented in either a vertical orientation (FIG. 7) or a tilted orientation (FIG. 8).

Referring further to FIG. 2, the procedure 200 computes, for each patch, statistics using the unexcluded range pixels/pels in each patch in step 270. These statistics can include the average height in the patch, and/or more generally, composite measurements for the object. These composite measurements are accurate to, for example, less that 5-10 microns and can be used reliably in further object handling and inspection operations. Note that individual range image sensor pixel/pel measurements are distinct from composite measurements, which are accurately produced by the process and include z-axis measurements, height measurements and relative height measurements. Thus, in step 280, the measurements in the statistics (such as average height, or more generally, composite measurements) can be reported to a user or other report-handling system. Alternatively, in step 290, the measurements (such as average height, or more generally, composite measurements) can be transmitted for use as a decision heuristic—such as comparing a measurement against a threshold to accept or reject an object.

III. Additional Processes

A desirable task is the estimation of the peak/highest, or maximum (MAX), height of the highest feature by computing the average height of a small patch near the peak. Since the exact location of the best small patch may typically be unknown, the process measures all small patches nearby and then selects the patch containing the MAX height. Since a measurement based on a single range pixel/pel is generally unstable, an individual range pixel/pel is not relied upon to evidence the maximum height. Rather the average height related to the highest feature is determined. Illustrative patch sizes can be between approximately 8×8 to 100×100 pixels, depending upon the feature size and the desired accuracy. In an embodiment, the computation determines the average height of visible pixels/pels, and ignores non-visible pixels/pels (based upon exclusion, occlusion, etc.) in generating the average pixel value.

Figure 9:
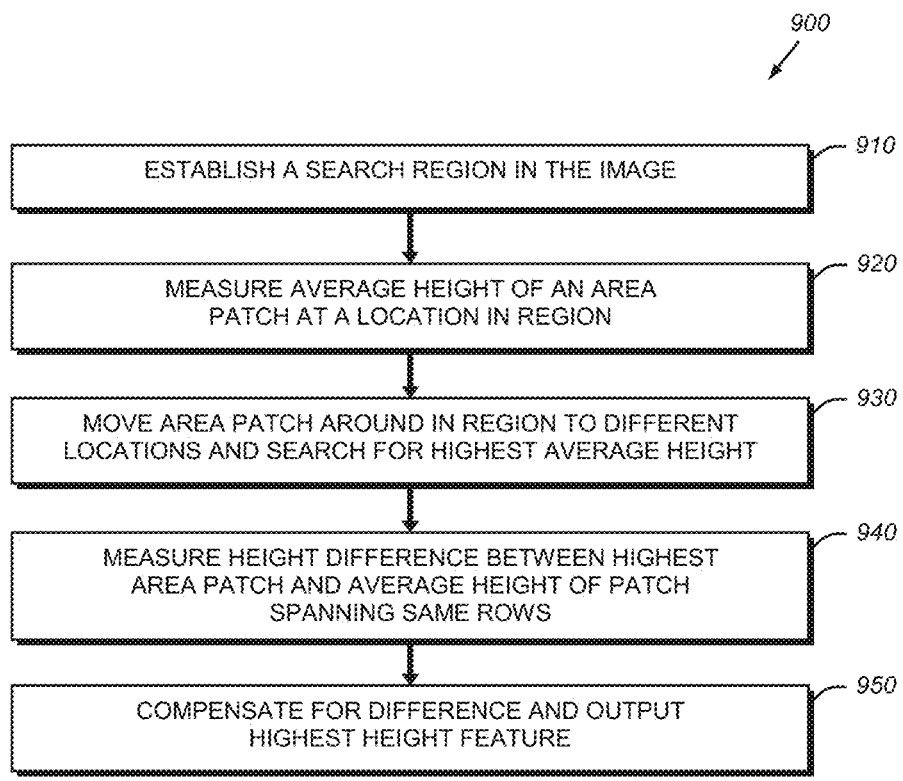
FIG. 9 is a flow diagram of a procedure for determining a peak displacement/height of an object feature and compensating for possible vibration along the height (physical z-axis) direction.

With reference to FIG. 9, an illustrative procedure 900 for measuring the highest or MAX height of the highest feature is shown. In step 910, the procedure 900 establishes a search region in the image data set that can contain a feature. This can be performed using a conventional vision system search tool such as PatMax® to fixture the search region by registering a feature, or alternatively by registering a fixturing feature which can be used to fixture the expected location of the feature to be measured, available from Cognex Corporation of Natick, Mass. The procedure 900 then measures the average height in an area patch that is established, and contained within, the region in step 920. The average compensates for physical z-axis noise and other potential inaccuracies, as described generally above. The average should ignore missing or insignificant ("don't care") range pixels/pels when computing the average height, and can omit or skip patches with a preponderance of missing/don't care pixels/pels. In step 930, the area patch (e.g. image x, y location) is then moved around the region to different image (x, y) locations therein, determining the average physical z-axis height of the patch in each location. This step searches for the patch location with the highest (MAX) average height from the multiplicity of patches placed around the region, which addresses potential positional variation in the feature's peak. Then, in step 940, the procedure 900 optionally measures the difference between the height of the patch with the identified MAX height and the average height of an expected reference patch spanning the same image rows. Note that the average physical z-axis height should be equally weighted by rows regardless of the actual location of visible/non-visible range pixels/pels. This enables compensation for jitter and vibration (step 950) as described further below.

Figure 10:
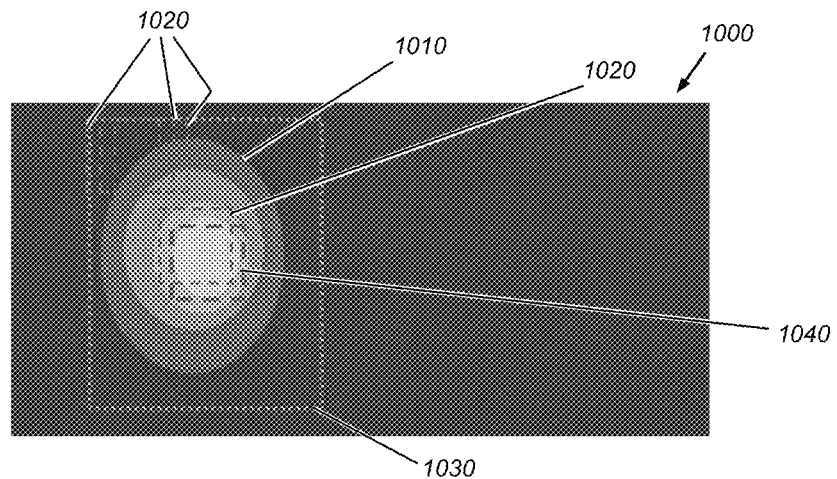
FIG. 10 is a diagram of an exemplary image with a feature showing the positioning of grid patches in accordance with the procedure of FIG. 9 to locate a peak displacement/height.

FIG. 10 graphically represents the procedure 900 using an exemplary image 1000. The peak height of an identified feature 1010 is measured by measuring the average height at multiple patches (thin dashed rectangles) 1020 within a search region 1030 of the overall image. The thick dashed rectangle 1040 characterizes the patch with maximal height.

It is recognized that vibration and jitter in the motion stage (conveyor) and/or moving displacement sensor can affect the accuracy of measurements of an object surface in the physical z-axis direction. The presence of vibration can be addressed by making relative measurements between patches on the same range image row. Each range image row corresponds to a single image acquisition. It is noted that differing range pixels/pels on the same range image row are typically subjected to the same vibrations. Thus, the physical z-axis differences between pixels/pels on the same range image row are invariant to vertical vibrations. By way of example, an available reference plane is established, and the feature heights with height values on the reference plane at the same rows are compared to compensate for vibration.

Figure 11:
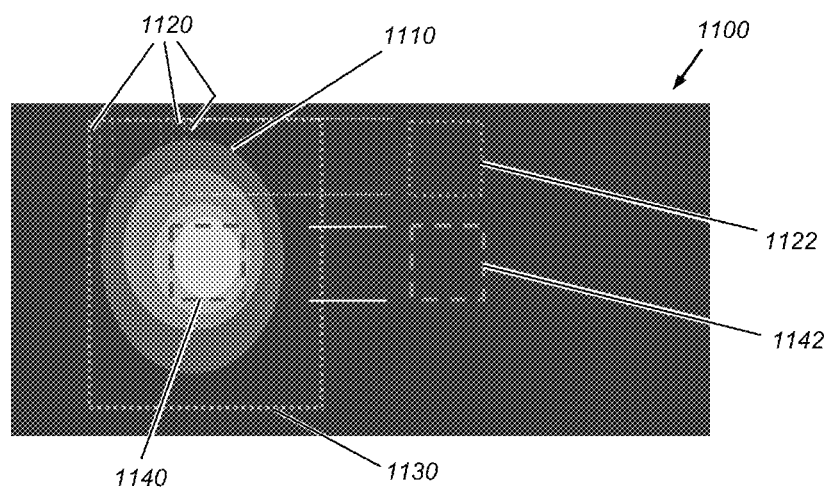
FIG. 11 is a diagram of an exemplary image with a feature in which the location of a peak is determined by searching grid patches, and patches are compared to reference patches to compensate for possible vibration in accordance with the procedure of FIG. 9.

FIG. 11 details an exemplary image 1100 in which the above-described procedure 900 for measuring the peak height of a feature 1110 (based on searching patches) can be combined with the above-described steps for addressing vibration, by comparing the height differences between the patch average height and the height of a corresponding reference patch. As shown, the thinner dashed rectangles 1120 represent patches that are searched in the search region 1130, and the thick dashed rectangle 1040 represent the patch with MAX feature height. The dashed rectangles 1122 and 1142 represent the corresponding reference regions for each patch 1120 and 1140, respectively. Typically, the user will specify a region containing the reference plane which could be a different region on the part, or, alternatively, a region not on the part but in the range image.

The general height measurement procedure 900 described above can be further optimized by tailoring the range image. Illustratively, smaller range pels can be used so that patch averaging can use more range pixels/pels for the same physical area. The range image x physical pixel size should correspond to the sensor's pixel/pel size at the height of the object. As described above, the range image y-physical pixel size depends on the stage motion and encoder settings. Decreasing the millimeters/row setting provides for smaller range pixels/pels. By way of example, a range image y-axis physical pixel/pel size can be set as small as 10 microns.

It should be clear that the system and method for measuring object surface displacement using a laser-based displacement sensor provides superior accuracy relative to conventional techniques. The procedure obtains accuracy that is similar to that of a CMM, but relies upon software processes and straightforward hardware setup. Measurements are obtained in a substantially shorter time frame than possible with a CMM.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein various directional and orientational terms such as "vertical", "horizontal", "up", "down", "bottom", "top", "side", "front", "rear", "left", "right", and the like, are used only as relative conventions and not as absolute orientations with respect to a fixed coordinate system, such as gravity. Also, height (z-axis) accuracy can be improved by setting camera assembly exposure so that detected features in the image remain unsaturated. Moreover, it is expressly contemplated that the procedure for measuring maximum height can be employed to measure minimum height by employing similar techniques and searching for patches with a minimum height on the object surface. Thus as used herein the term "maximum displacement" can refer to either a maximum surface height or a minimum surface height. Accordingly, this description is meant to be taken only by way of example, and not to otherwise limit the scope of this invention.

What is claimed is:

1. A system for measuring displacement of an object surface comprising:
a displacement sensor that projects a line on the object surface and receives light from the projected line at an imager in a manner defines a plurality of displacement values in a height direction;

a vision system processor that processes at least two rows of displacement value image data from the imager and defines a plurality of patches with respect to the displacement value image data, the patches being oriented to register features of the image data; and a displacement sensor process performed by the processor that averages the displacement values in each of the patches to obtain an average patch displacement value.

2. The system as set forth in claim 1 wherein the object and the displacement sensor are in relative motion and wherein a plurality of images are acquired of the projected line, the motion being defined so that displacement values are oversampled.

3. The system as set forth in claim 2 wherein patches containing predetermined features have pixels that are excluded by the displacement sensor process.

4. The system as set forth in claim 3 wherein the predetermined features define at least one of dimples, bevels, edges, protrusions or occlusions.

5. The system as set forth in claim 2 further comprising a registration tool that locates at least one feature on the object and registers the patches with respect to the object.

6. The system as set forth in claim 1 wherein the displacement sensor process varies resolution of pixels in at least one dimension to oversample displacement values in the at least one dimension.

7. The system as set forth in claim 1 wherein the displacement sensor is angled with respect to the object surface to minimize blooming from light received by the imager.

8. The system as set forth in claim 1 wherein the displacement sensor process searches average patch displacement values in a region located with respect to a feature to determine a patch containing a maximum displacement for the feature.

9. The system as set forth in claim 8 wherein the displacement sensor process compares the patch containing the maximum displacement value to a reference patch displacement value to compensate for vibration.

10. The system as set forth in claim 1 wherein each of the patches defines a size between 8×8 and 100×100 pixels.

11. The system as set forth in claim 1 wherein the displacement sensor process excludes patches having a preponderance of missing or insignificant displacement values.

12. A method for measuring displacement of an object surface comprising:

projecting a line on the object surface and receiving light from the projected line at an imager in a manner defines a plurality of displacement values in a height direction;

processing at least two rows of displacement value image data from the imager and defining a plurality of patches with respect to the displacement value image data, the patches being oriented to register features of the image data; and averaging the displacement values in each of the patches to obtain an average patch displacement value.

13. The method as set forth in claim 12 further comprising varying resolution of pixels in at least one dimension to oversample displacement values in the at least one dimension.

14. The method as set forth in claim 13 wherein the step of varying comprises controlling relative motion between the object and the imager to acquiring a plurality of images on overlapping regions of the object.

15. The method as set forth in claim 12 further comprising excluding pixels in patches containing predetermined features from the step of averaging.

16. The method as set forth in claim 15 wherein the predetermined features define at least one of dimples, bevels, edges, protrusions or occlusions.

17. A vision system comprising:

an imager that receives light from a projected line on a surface, the light defining a plurality of displacement values in a height direction; and a vision system processor, operatively connected to the imager, arranged to (a) process at least two rows of displacement value image data from the imager within a plurality of patches with respect to the displacement value image data, the patches being oriented to register features of the image data, and (b) average the displacement values in each of the patches to obtain an average patch displacement value.

18. The vision system as set forth in claim 17 wherein the imager is enclosed in a laser displacement sensor housing that projects a laser line on the surface.

19. The vision system as set forth in claim 18 wherein patches containing predetermined features have pixels that are excluded.

20. The vision system as set forth in claim 17 further comprising a registration tool that locates at least one feature on the surface and registers the patches with respect to the object.

* * * * *